Aug. 26, 1952 N. C. PRICE 2,608,054
AIR TURBINE STARTING MEANS FOR GAS TURBINE POWER PLANTS
Original Filed March 6, 1942 5 Sheets-Sheet 1

FIG. I.

INVENTOR
NATHAN C. PRICE.
BY George C. Sullins

Aug. 26, 1952     N. C. PRICE     2,608,054
AIR TURBINE STARTING MEANS FOR GAS TURBINE POWER PLANTS
Original Filed March 6, 1942     5 Sheets-Sheet 2

INVENTOR.
NATHAN C. PRICE
BY
Agent

Aug. 26, 1952   N. C. PRICE   2,608,054
AIR TURBINE STARTING MEANS FOR GAS TURBINE POWER PLANTS
Original Filed March 6, 1942   5 Sheets-Sheet 3

INVENTOR
NATHAN C. PRICE
BY George C. Sullivan

Aug. 26, 1952  N. C. PRICE  2,608,054
AIR TURBINE STARTING MEANS FOR GAS TURBINE POWER PLANTS
Original Filed March 6, 1942  5 Sheets-Sheet 5

INVENTOR
NATHAN C. PRICE
BY George A. Sullivan

Patented Aug. 26, 1952

2,608,054

UNITED STATES PATENT OFFICE 2,608,054

AIR TURBINE STARTING MEANS FOR GAS TURBINE POWER PLANTS

Nathan C. Price, Hollywood, Calif., assignor to Lockheed Aircraft Corporation, Burbank, Calif.

Original application March 6, 1942, Serial No. 433,599, now Patent No. 2,540,991, dated February 6, 1951. Divided and this application September 8, 1945, Serial No. 615,167

7 Claims. (Cl. 60—39.14)

This invention relates to prime movers of the internal combustion reaction type and of the turbo-compressor class, and relates more particularly to control systems for such power plants. This application is a division of my copending application, Serial No. 433,599, filed March 6, 1942, now Patent No. 2,540,991.

Power plants of the classes above mentioned are useful for the propulsion of aircraft and other vehicles. It is desirable in such applications to provide a starting system for initiating operation of the power plant and to provide a control means for effecting simple manual control of the various power plant elements. It is also important to obtain sequential operation of the starting system and control system elements and to coordinate the control means for the efficient operation of the power plant under various conditions of speed, load, altitude, etc. So far as I am aware, power plants of the above class that have been introduced and suggested do not embody control and starting systems capable of obtaining these results.

It is therefore a general object of this invention to provide a power plant of the internal combustion reaction type or turbo-compressor type embodying an easily and conveniently operable starting and control system for producing sequential operation of the power plant starting and control means and for maintaining full control over the power plant during operation. The system of the invention is characterized by a single throttle lever adapted to be manipulated to put the several elements of the starting means into operation in the correct sequence in order to start the power plant and to thereafter control the speed of operation of the plant as desired. The single throttle lever is the only part of the system requiring manual operation for starting of the power plant, for power plant operation and for termination of its operation, although the control includes certain manually regulable elements, each incorporating an independent manually operable part for effecting minor and more or less fixed adjustments.

Another object of the invention is to provide a power plant control system of the character above referred to embodying simple light-weight and economical starting means utilizing air under pressure as the actuating medium in a small capacity air motor which drives the turbine and compressors of the power plant to bring them up to the starting speed and to maintain that speed until the plant is self-motoring. The air pressure employed for starting the plant is bled from the power plant compressors and stored in a flask for the subsequent starting operations, and an auxiliary or stand-by air pressure producing means is provided to assure the maintenance of sufficient pressure in the flask for starting the plant at any time. The starting system is self-contained and is always available for initiating operation of the power plant.

Another object of the invention is to provide a control system of the class above mentioned which obtains the proper sequence of operation of the starting motor, fuel injection means and fuel igniting means to quickly initiate power plant operation. Simple movement of the manual throttle lever to the starting position results in the automatic operation of the starting motor, fuel injection and igniting means in the correctly timed sequence.

A further object of the invention is to provide a control and starting system of the character mentioned above wherein the starting motor serves, during operation of the power plant, to drive a generator associated with a storage battery set and further serves as a refrigerating or temperature controlling element of a system for pressurizing or air conditioning a compartment of the aircraft or vehicle.

Other objects and features of novelty will be evident hereinafter.

This invention in its preferred forms is illustrated in the drawings and hereinafter more fully described.

Figure 7:
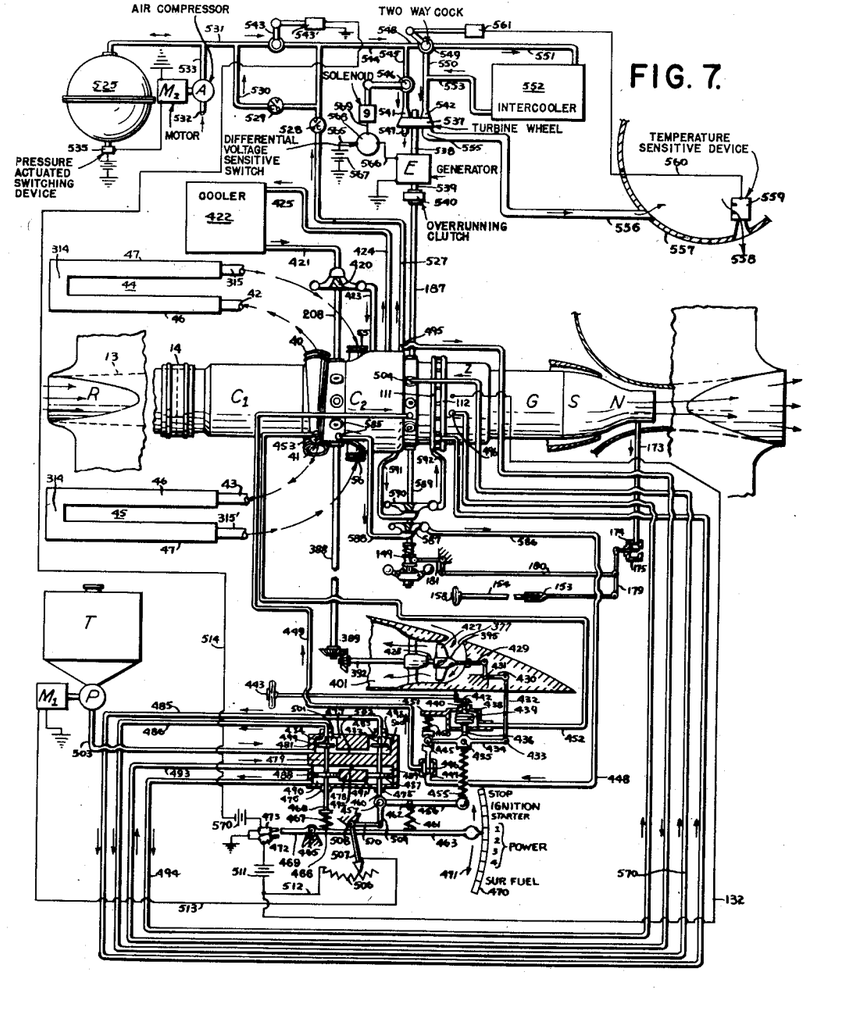
Figure 7 is a typical flow diagram for the installation of the power unit of Figure 1 in an airplane or airplane wing.

The power plant, in which the present invention is embodied has a cylindrical housing 10 for the multi-stage axial blower $C_1$ which constitutes the first stage air compressor. The housing 10 is provided at the forward end with an annular opening 11 defined by a grooved spigot 12, both of which are of substantially full axial blower diameter and to which a forwardly directed conical ram 13 comprising a tubular conduit of truncated conical shape may be semiflexibly attached by means of a short flexible coupling 14 as best shown in Figure 7. This ram normally extends out of the leading end of the fuselage or the leading edge of the wing according to the type of installation, and faces forward into the relative airstream with the open end of smallest diameter foremost, whereby intake air may be caught and initially compressed in the ram by impact effected by the high velocity of the air relative to the aircraft, under flight conditions prior to its entrance into the beforementioned axial blower.

The rotor shell 20 of the axial blower $C_1$ has a form which may be defined approximately as a truncated, prolate spheroid, and is constructed, preferably, from a relatively thin metal tube spun to the desired shape. A plurality of axially spaced reinforcing rings 21 of suitably varying diameters are attached to the inside surface of the rotor shell 20 by suitable means such as by welding and furnace brazing, one such ring preferably being positioned opposite each row of the plurality of rows of impeller blades 25.

Figure 2:
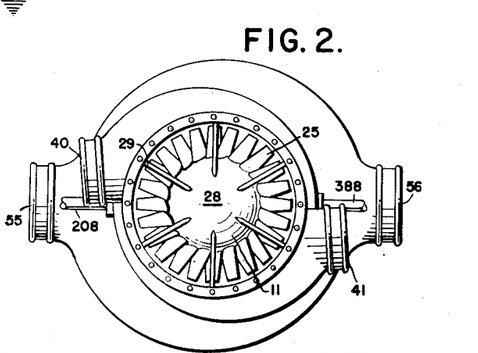
Figure 2 is a frontal view of the unit taken at line 2—2 of Figure 1.
Figure 8:
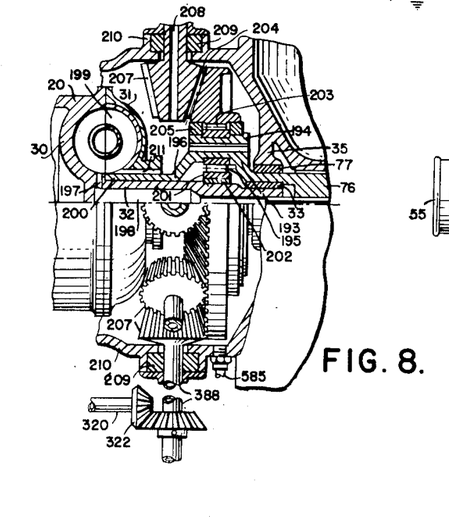
Figure 8 is an enlarged detail view in partial cross-section of the accessory drive transmission.

The forward end of the axial blower rotor 20 carries a coaxially positioned, forwardly extending hollow spindle 26 with which it is rotatably supported in suitable bearings 27 which are in turn supported within the streamlined forward bearing housing 28. This forward rotor bearing housing 28 is supported and centrally positioned within the axial blower housing inlet spigot 12 by means of a plurality of interconnecting radially disposed, streamlined struts as best shown at 29 in Figure 2. The struts, in addition to their structural function, serve as air straightening vanes to prevent uncontrolled swirl of air at the inlet of the blower, thereby increasing efficiency of compression. The rear end of the rotor shell 20 is closed by the inner formed half 30 of the housing of a fluid coupling unit F which in turn carries a coaxially positioned rearwardly extending spindle 32 as best shown in Figure 8. The fluid coupling structure thus serves as part of the rotor structure, thereby conserving weight and space. Furthermore, in operation, heat developed in the coupling is carried off by indirect heat exchange with the air being discharged from the blower. The said spindle 32 is rotatably supported in suitable needle bearings 33 within the end of the shaft 76, which is in turn rotatably supported centrally within the power plant housing by means of bearing 77 carried in a suitable lateral diaphragm or web 35.

The axial blower housing 10 carries on the inside, a plurality of rows of inwardly extending, radially disposed, stationary diffuser vanes 37 arranged to stand intermediate the rows of impeller blades 25 and fitting with small clearances between said blades and said rotor shell. This housing, which may be fabricated or cast of a light-weight metal such as magnesium alloy, is provided on the outside with a plurality of relatively deep intersecting, laterally and longitudinally disposed ribs 36 for the purpose of imparting sufficient stiffness thereto to maintain impeller-vane clearance to close tolerances.

The inner exhaust end of the axial blower terminates in a split, double scroll outlet housing 38—39 having a pair of outlet spigots 40 and 41 which lead through suitable couplings 42—43 to suitable intercoolers which may be arranged in the airplane wings as shown at 44—45 in Figure 7, and hereinafter more particularly described.

The axial blower rotor is driven through a planetary transmission and a fluid coupling as best shown and hereinafter described in connection with Figure 8.

Figure 1:
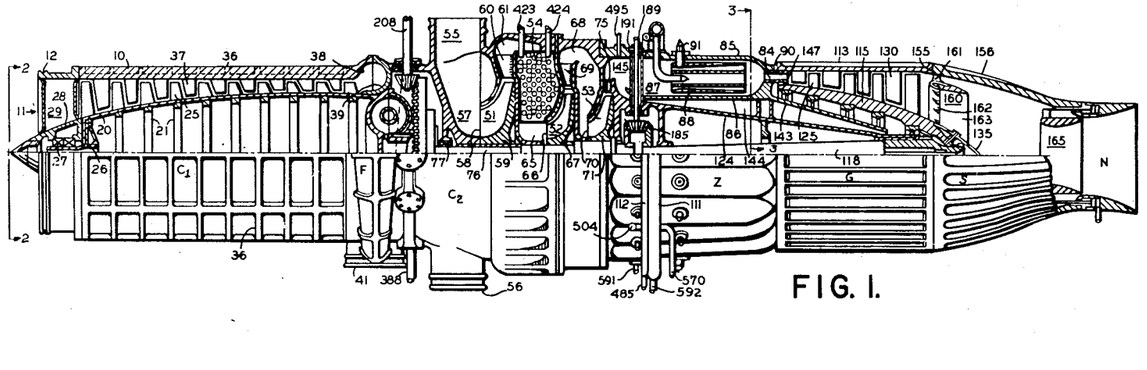
Figure 1 is an elevation in partial cross section of the general assembly of the power plant unit of the invention.

Located in the intermediate portion of the power plant and immediately to the rear of the axial blower transmission is the second stage air compressor unit $C_2$ which is preferably of a high speed multi-stage radial flow or centrifugal blower type as shown in Figure 1. This centrifugal blower comprises three additional stages of centrifugal compression 51, 52 and 53 in tandem arrangement with a liquid feed intercooler 54 intermediate its first and second stages.

A pair of inlet nozzle connections 55 and 56 serve to receive the first stage compressed air from the beforementioned wing intercoolers and to introduce it through the annular chamber 57 to the inlet 58 of the first centrifugal impeller 59. A plurality of stationary diffuser vanes 60 receive the compressed air from the impeller 59, and annular chamber 61 serves to direct the flow of air therefrom to the inlet of the said liquid fed intercooler 54 which is more fully described hereinafter. The outlet 65 of the intercooler 54 communicates with the inlet 66 of the second centrifugal blower impeller 67 and the annular shaped chamber 68 formed in the body of the unit in turn serves to direct compressed air leaving impeller 67 after passing through the stationary diffuser vanes 69, to the inlet 70 of the third and final centrifugal compressor impeller 71. Air from the final stage impeller 71 passes through stationary diffuser vanes 75 to the entrance of the combustion chamber Z.

Cooling is effected by circulation of a suitable liquid coolant such as ethylene glycol through the intercooler coils and through a suitable heat exchanger external to the blower as hereinafter mentioned in connection with Figure 7 in the description of the operation.

Figures 10, 11:
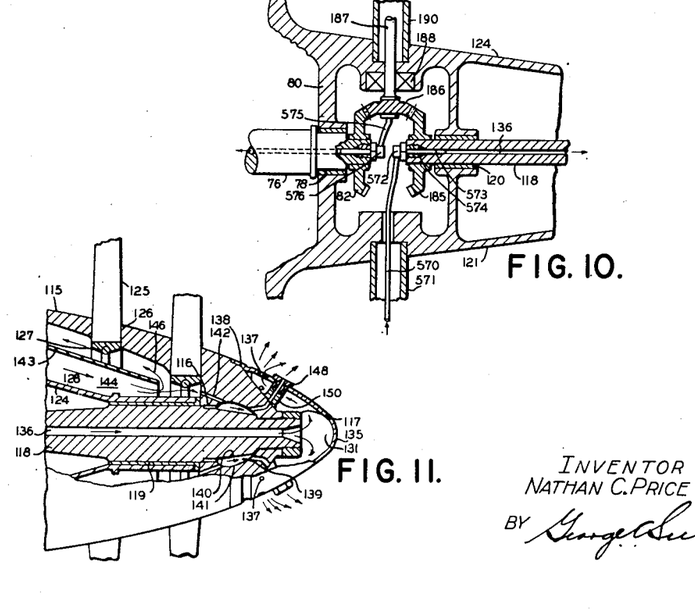
Figure 10 is an enlarged fragmentary cross-sectional view of the counter-rotation transmission of Figure 1.
Figure 11 is an enlarged fragmentary cross-sectional view of the apex of the gas turbine showing the supplementary fuel jets and other details.

The said three centrifugal blower impellers 59, 67 and 71 are fixed to a common shaft 76 which is rotatably journaled at its forward end in bearing 7E as best shown in Figure 8 and at the rear end in bearing 78 (Figure 10). Bearing 77 and 78 are supported coaxially within the body of the centrifugal blower portion of the power unit by suitable diaphragms or webs 35 and 80 respectively. The forward extension of the centrifugal blower shaft 76 couples into the axial blower and accessory transmission in a manner more fully described hereinafter. The rear end of the shaft 76 carries a bevel gear 82 which constitutes a portion of the counter-rotation transmission through which it is driven by the gas turbine G, also as more fully described hereinafter.

Figure 3:
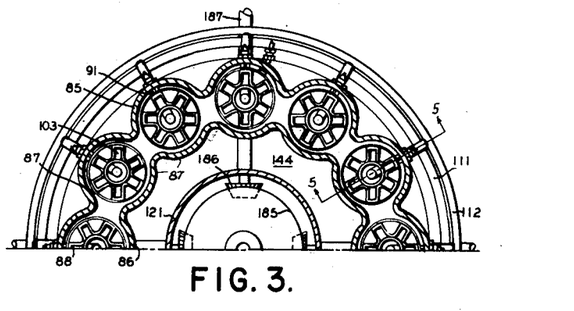
Figure 3 is a partial cross-sectional view taken on the line 3—3 of Figure 1 showing the arrangement of the fuel burners.
Figures 4, 5, 6:
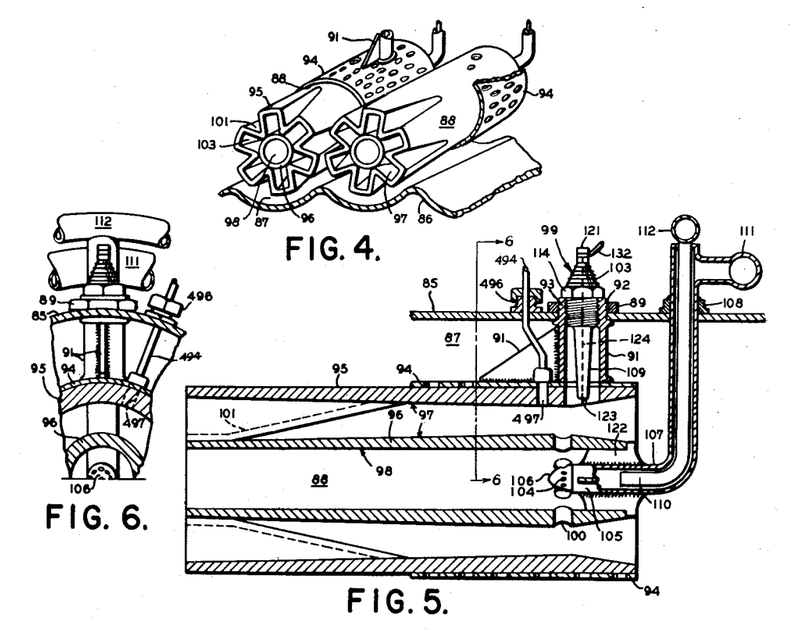
Figure 4 is a perspective view of a pair of the burner tubes of Figure 3.
Figure 5 is an enlarged longitudinal sectional view taken at line 5—5 of Figure 3.
Figure 6 is a fragmentary sectional view taken on line 6—6 of Figure 5.

The beforementioned combustion chamber Z into which the final stage compressor discharges, is an approximately annular space defined on the outside by the housing 85 and on the inside by a shroud 86, both preferably fabricated from a heat resistant alloy such as nickel-chromium-iron. The said outside housing 85 and inner shroud 86 are formed with adjacent and oppositely facing Ogee curves which together form in effect, a series of sidewardly interconnected parallel cylindrical pockets or barrels 87 having their axes equidistant from and parallel to the axis of the power unit and adapted to house the plurality of cylindrical burner tubes 88, as best shown in Figures 3, 4 and 5. The substantially annular combustion chamber Z, comprising said pockets or barrels, converges at the rear end to an annular nozzle ring 90 of reduced cross-sectional area and containing in the portion of reduced area, a plurality of circumferentially spaced vanes as shown at 84 in Figure 1. The said combustion chamber nozzle ring 90 serves to hold a back pressure upon the combustion chamber and to efficiently discharge hot gases at high velocity from the combustion chamber into the expansion zone of the gas turbine G.

The beforementioned burner tubes 88 are each coaxially positioned and rigidly supported within each of the combustion chamber pockets 87 by means of a streamlined tubular strut as shown at 91, which passes radially out through the combustion chamber shell 85 and is retained in gas-tight connection therewith by means of external nuts 89 threaded at 92 to the outwardly projecting portion 93 of the said structs. The inner end of the said strut makes welded connection with a perforated cylindrical sleeve 94 in which the burner tube 88 is firmly gripped. The perforated sleeve 94 and strut 91 are preferably constructed of a heat resistant metal alloy such as nickel-chromium-iron.

The burner tubes which are preferably constructed of a refractory material such as "Carborundum," are as previously stated cylindrical in general form, but are constructed as best shown in Figures 4 and 5 of two concentric tubular portions 95 and 96, which together form an intermediate annular passageway 97 having an approximate Venturi shape as viewed in longitudinal cross section, and an inner straight cylindrical passage 98. The Carborundum can withstand a temperature of 3500° Fahrenheit. In case a thermal fracture should develop in the Carborundum the air-cooled perforated sleeve 94 serves to hold the fractured parts together.

The outer tubular wall 95 of the burner is formed with a plurality of external V-shaped flutes of variable depth, as shown at 101, which extend upward and vanish at a point about half the length of the burner from the rear or outlet end 102. The inner surfaces of the V-shaped flutes make contact at their inner vertices with the rear portion of the beforementioned inner tubular portion 96 of the burner, and form in conjunction therewith, a plurality of circumferentially spaced outlet openings as best shown at 103 in Figure 4. Concentric support for the rear end of the said inner tube 96 is also thus provided.

A plurality of radially directed holes, as shown at 100, pass through the inner tubular portion of the burner at the throat portion of the Venturi section.

Fuel spray nozzles extend concentrically for a short distance into the forward ends of each of the before described burner tubes, as shown at 105, and each nozzle carries at the inner end, a spray head 106 provided with peripherally spaced perforations 104 adjacent and coaxially directed with respect to the beforementioned holes 100 leading into the annular combustion passage. The said spray nozzle communicate with, and are supported by, air injection tubes 107 which extend laterally through suitable flanged inlet connections 108 provided in the rear portion of the combustion chamber housing 85. These air injection tubes make connection through suitable manifolding 111 to a source of compressed air; and centrally positioned within the air injection tubes 107, and extending to a point close to the nozzle head is a fuel injection tube 110 which makes external connection through a manifold 112 to suitable fuel supply pumps and regulators hereinafter described in connection with the flow diagram of Figure 7. The fuel spray nozzles are each provided with a spider comprising a number of relatively thin radially positioned webs, as shown at 122, adapted to fit snugly into the inside of the forward portion of the inner burner tube 96. The said spider thus serves as a positioning and centering support for the forward end of the inner burner tube.

Making threaded connection into each of the outer end portions 93 of the burner tube struts 91 which extend outside of the combustion chamber housing 85, is a glow plug 99 which serves as the igniting means for the combustible fuel-air mixture which is formed in and flows through the burner tubes. The glow plug is constructed with a threaded metal bushing potrion 114 surrounding an elongated central refractory insulating body portion having an inwardly projecting tapered shank 109 extending through the strut 91 to the throat of the burner tube, and an outwardly extending ribbed insulating portion 103 carrying a terminal 121. A small filament or coil 123 of high melting point wire such as platinum, supported upon the inner end of the body portion of the plug is electrically connected through a central conductor bar 124 terminal 121 and a conductor wire 132 to a suitable source of low tension electric current hereinafter more specifically described in connection with Figure 7. The refractory body portion of the glow plug may be composed of Carborundum, mica or the like insulating materials.

The described combustion chamber portion of the power plant is adapted to burn fuel efficiently over an unusually wide mixture range, in a very small space employing to the utmost degree the advantages of surface combustion. Here the fuel is uniformly dispersed prior to leaving the nozzles and the gases of combustion formed in the burner tubes are properly mixed with the excess air. The high temperatures are localized at the Carborundum surfaces within the burner tubes which are adapted to withstand heat, whereas the outer casing and fuel spray nozzles, which are exposed only to the air stream, remain comparatively cool.

The gas turbine G, which is contained within a cylindrical housing 113, comprises a tapered rotor 115 coaxially positioned within the power plant with the end of minimum diameter facing rearwardly in the direction of flow of the propellant gases. The said rotor 115 is splined at 116 and bolted at 117 to the rear end of a hollow, tapered shaft 118, which is in turn rotatably supported concentrically within the power unit upon a pair of shaft bearings comprising a forward bearing 120 and a rear bearing 119. The rear turbine motor shaft bearing 119 is supported by means of a hollow truncated cone shaped cantilever member 124 which is attached at its forward end of largest diameter to the transverse bulkhead web 80, which separates the final stage compressor housing from the combustion zone and gas turbine housing.

The gas turbine rotor is provided with a plurality of rows of impeller blades or buckets as shown at 125 in Figures 1 and 11, which may be constructed from heat resistant, high strength alloy such as nickel-chromium-iron. The said turbine rotor blades 125 are adapted to be inserted from the inside and to make a light press fit through suitably shaped openings 126 broached in the rotor shell 115. Internal, circular snap rings 128 adapted to lie in suitable grooves 129 formed along the inside ends of the blade root shoulders serve to hold the blade shoulders firmly in seated position in the rotor at all times.

The plurality of gas turbine stator blades as shown at 130, and which extend radially inward intermediate the before described rows of impeller blades are attached by welding at their outer root ends to the interior surface of the cylindrically shaped turbine housing 113.

At the apex of the turbine rotor, a conical cap member 135 encloses a space 131 into which fuel may be injected under pressure by way of a bore 136 within the hollow turbine shaft 118. The said conical cap is provided with a plurality of divergingly directed orifices 137 equi-spaced in its periphery and adjacent its end of greatest diameter, where it meets and makes oil-tight connection at 138 with the rotor body 115. Injection of supplementary fuel at this point greatly increases the thrust of the power plant by efficiently distributing added fuel to burn the excess air leaving the gas turbine wheel and about to enter the main propulsive nozzle.

The thrust output of the power plant is enhanced by operation with relatively high temperature gases entering the gas turbine. The limitation of temperature has a structural basis. The gas turbine can operate in a higher temperature range than that of conventional turbines because of the structural provisions and cooling arrangements provided.

A truncated cone shaped baffle 143 is provided as a rearward extension of the inner shroud 86 of the beforementioned combustion chamber Z. The tapering annular-like space 144 thus formed between the conical shaped outer turbine bearing support 124 and the said inner combustion chamber shroud 86 and the baffle 143, serves to conduct cooling air under suitable pressure from the annular forward end of the combustion chamber at 145 to the inner apex of the turbine rotor adjacent the bearing 119, and thence counter-current to the propellant gases in the turbine as shown by arrow 146 back along the inner surface of the turbine rotor 115 and in contact with the inner ends of the rotor blade roots 127 to the openings in an annular cooling air nozzle ring 147, which is immediately inside of, and concentric with, the gas turbine nozzle ring 90. A plurality of drilled ducts as shown at 142, are provided for conducting a portion of the cooling air from the inside of the rotor to the annular cooling cavity 139 formed between the taper 140 adjacent the end of the turbine rotor shaft and an adjacent relieved concavity 141 in the turbine rotor. A plurality of exhaust nozzles 148 are provided for exhausting cooling air from the cavity 139 into the secondary combustion chamber S, and are in the form of drilled cap screws which pass through suitable holes in the cap 135 and make threaded connection into nipples 150 which are welded to the turbine rotor body. The said nozzles thus also serve to retain the cap 135 in oil-tight position on the apex of the turbine. The turbine cooling system forms the subject of my copending application, Serial No. 573,562, filed January 19, 1945, now Patent No. 2,563,744.

Figure 9:
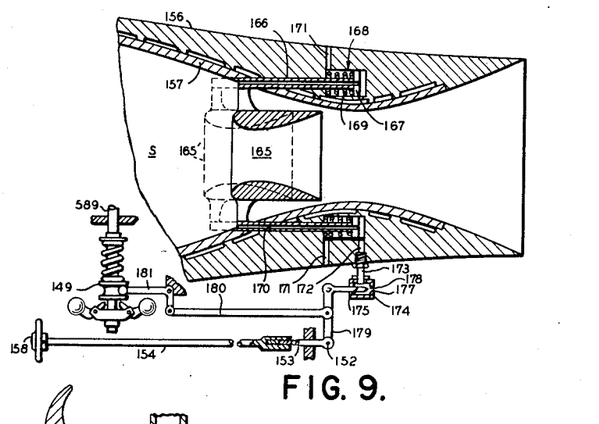
Figure 9 is an enlarged fragmentary cross-sectional view of the variable opening nozzle.

Immediately to the rear of the gas turbine, and attached at 155 to the gas turbine housing, is the secondary combustion chamber S and nozzle section N which comprise an approximately Venturi shaped housing 156 carrying a refractory lining 157 which may be Carborundum or the like material, as best shown in Figure 9. The secondary combustion chamber is shaped to utilize the kinetic energy of the residual gas velocity from the turbine wheel so that it is additive to the kinetic energy of the propulsive jet.

An annular baffle 160 having a streamlined section similar to that of an airfoil is concentrically supported adjacent the gas turbine exhaust within the entrance to the secondary combustion chambers and diametrically opposite the secondary fuel orifices 137 in the rotor cap 135 by means of a plurality of radially directed interconnecting streamlined struts 161. This baffle is preferably constructed with a leading edge portion 162 of heat resistant metal such as a nickel-chromium-iron alloy and a body and trailing edge portion 163 of Carborundum, or like refractory material.

The nozzle portion N is provided with an inner longitudinally movable annular throat member 165 supported upon a plurality of parallel, axially positioned rods 166 which extend through and make a sliding fit in suitable holes in the nozzle lining and are fixed at the inner ends to an annular shaped servo piston 167 located within an annular shaped servo cylinder 168 in the nozzle body as best shown in Figure 9. The piston 167 and annular throat member 165 are urged rearwardly by means of a number of coil springs 169 acting under compression against the forward or rod side of the said annular piston.

The said parallel axially positioned rods 166 upon which the annular throat member 165 is movably supported, are provided with coaxial bores as shown at 170, which extend through the servo piston 167 and thus provide pressure equalizing passages through which gases from the chamber S can enter the working end of the cylinder 168. The rod end of the said annular cylinder 168 is provided with a plurality of atmospheric vent ducts as shown at 171. The head end of the cylinder 168 is provided with a bleed duct 172 connected through tubing 173 with a bleed control valve body 174 which may be located at any convenient place within the airplane structure. The said bleed control valve 174 comprises a stem 175 having a needle point adapted when closed to rest upon a beveled valve seat 177. The valve bleed is vented to atmosphere at 178. The said needle valve stem 175 is operatively connected through suitable linkage comprising lever 179, rod 180 and bell crank 181, to a fly-ball speed governor 149 which may be driven from one of the gas turbine accessory drive shafts such as indicated at 589, whereby an increase or decrease of turbine speed will act through the said governor 149, to respectively increase or reduce the needle valve opening. The lever 179 is pivotally supported at 152 upon a threaded shaft 153 by means of which the speed setting of the governor with respect to the needle valve action can be adjusted through a shaft extension 154 by means of a wheel 158 which may be conveniently located in the flight compartment.

The movable annular throat member 165 is so shaped that its axial displacement resulting from the speed responsive pressure variation in cylinder 168 as influenced by the action of the needle valve bleed 174 as controlled by the governor 149 results in an effective change of nozzle area, at the same time maintaining streamline and high nozzle efficiency. The variable nozzle means just described forms the subject of my copending application Serial No. 734,649, now abandoned.

Power is adapted to be transmitted from the gas turbine to the radial and axial blowers and to the various auxiliary drive shafts throughout the unit through suitable gear transmissions which comprise the following apparatus:

Referring primarily to Figures 1, 8 and 10, the forward end of the hollow gas turbine shaft 118 carries fixed at a point just forward of the bearing 120, a bevel gear 185 which meshes with a plurality of bevel pinions as shown at 186, each splined to the inner end of a radially positioned auxiliary drive shaft as shown at 187 in Figure 10 and at 187 and 589 in Figure 7. The said auxiliary pinion drive shafts are each rotatably supported upon a pair of suitable bearings as shown at 188 and 189, and a number of such shafts as required, are arranged to pass radially through the forward portion of the combustion chamber through tubular housings 190 and out of the combustion chamber housing through stuffing boxes as indicated at 191.

Fixed to the rear end of the radial blower shaft 76 and adjacent the bearing 78 is a bevel gear 82 which also meshes with the before mentioned bevel pinions 186. Shafts 76 and 118 are thus adapted to counter-rotation with respect to one another, through the action of the transmission comprising bevel gears 185 and 82, and bevel pinions 186.

A pipe 570 for supplementary fuel, enters the combustion zone housing as shown at 504 in Figure 7 and extends radially through a tubular housing 571 not occupied by an auxiliary drive shaft to a centrally positioned angle fitting 572 adjacent the forward end of the gas turbine shaft 118. A tube 573 extends from the said angle fitting 572 through a packing gland 574 and into the central bore 136 of the said shaft. An oil line 575 similarly makes connection at 576 with the central bore of the centrifugal compressor shaft 76 by way of which lubricating oil may be introduced under pressure through the rear, axial blower shaft 32 and into the fluid coupling by way of opening 197 in the housing as best shown in Figure 8.

Referring now primarily to Figure 8, which shows in enlarged detail, the type of axial blower transmission employed in the unit of Figure 1, the centrifugal compressor shaft 76, as before stated, is rotatably journaled at the fore and aft ends in bearings 77 and 78 respectively. The shaft 76 makes connection just forward of the bearing 77 through a conical flange 193 with a planetary drive spider 194, which carries therein six parallel shafts upon which are rotatably mounted six planetary pinions as shown at 195. A further extension 196 of the shaft 76, forward of the planetary drive spider 194, enters the fluid coupling housing 30—31 and carries fixed on the end thereof, the fluid coupling impeller 199. The just mentioned forward shaft extension 196 makes a rotatable fit over the rear axial blower shaft 32 at 200. A laterally directed drilled hole 197 is provided interconnecting the fluid coupling housing with the bore 198 of the rear axial blower shaft 32 through which oil may be introduced under suitable pressure into the said coupling. Annular clearance 211 between the outside of shaft 32 and the coupling housing entrance is provided for continuous escape of oil from the coupling unit.

The beforementioned planetary pinions 195 mesh with an inner sun gear 201 which is keyed to the axial blower spindle 32 at 202, and they also mesh with an outer planetary ring gear 203 formed on the inside diameter of the bevel accessory drive gear 204. The ring-like unit comprising the bevel gear 204 and the planetary ring gear 203 are rotatably supported upon the outside shoulders of the planetary spider 194 by means of a pair of suitable ball bearings 205. The bevel gear 204 meshes with a plurality of bevel pinions, as shown at 207, which are carried on radially positioned outwardly extending accessory drive shafts as shown at 208, which are rotatably supported in suitable bearings 209 carried in the transmission housing 210. The said outwardly extending accessory drive shafts make external connection with auxiliary variable speed apparatus, as more fully described in connection with the auxiliary apparatus and controls of Figure 7. An oil scavenging line for withdrawal of oil discharged from the fluid coupling enters the bottom of the transmission housing at the lowest point, as shown at 585.

The axial blower outlet spigots 40 and 41 each make connection through suitable conduits as shown at 42 and 43 to wing skin intercoolers 44 and 45 which are positioned spanwise in the wings. Each skin intercooler comprises an airtight outflow and a return flow portion 46 and 47 interconnected at 314, and preferably bounded in part by a portion of the upper and lower wing skins respectively, and adapted thereby to permit heat exchange directly through those portions of the wing skin to the relative air stream flowing in contact with the outside surface thereof. The pressure of the air discharged from the axial blower is sufficiently low to permit it to be confined in this manner directly in suitable portions of the wing structure, as for example, in corrugations directly underlying the skin. Thus the air can be intercooled to a temperature close to that of the wing-air boundary layer. The said return portions 47 of the wing intercoolers make connection through ducts 315 and 315' with the inlet spigots 55 and 56 of the second stage compressor $C_2$.

The outlet spigots 40 and 41 of the axial blower $C_1$ make connection through suitable curved ducts 42 and 43 to the outward flow passes 46—46 of the spanwise arranged wing skin intercoolers 44 and 45. The return passes 47—47 of the wing skin intercoolers 44—45 make connection through suitable curved ducts 315—315 to the inlet spigots 55 and 56 of the radial blower compressor $C_2$.

Auxiliary shafts 388 project from the axial blower transmission and extend spanwise through the wing and make geared connections at 389 with longitudinally positioned shafts as shown at 392 which are adapted to drive boundary layer removal fans 395.

Each of the boundary layer removal fans 395 communicates on the suction side with boundary layer removal slots 377 through suitable passages within the wing. The exhaust ends of the fans communicate through similarly formed conduits with a spanwise extending passageway 403 within the wing which in turn may communicate with an augmenter at the nozzle N.

The boundary layer removal and control means and system form the subject of my copending application, Serial No. 572,924, filed January 15, 1945, now issued as Patent No. 2,514,513 July 11, 1950.

Referring now to Figure 7, a flow diagram illustrating the arrangement of suitable piping, manual and automatic controls, and auxiliary apparatus which may be associated with the power unit for its installation in an airplane, is shown.

The power unit hereinbefore described, and as shown at RC1C2ZGSN, is provided with a pair of horizontally and oppositely directed auxiliary shafts 208 and 388 and obliquely extending auxiliary shaft 617 and 619 extending from the axial blower transmission. The auxiliary shafts 388 make driving connection through suitable gearing as shown at 389 with the longitudinally positioned drive shafts 392 of the boundary layer removal fans 395. The auxiliary shaft 208 makes driving connection with one or more centrifugal coolant circulating pumps as shown at 420. The suction of said coolant pump 420 connects through suitable piping 421 with the outlet connection of a cooler 422 not shown in Fig. 7, which may be located in any suitable position within the fuselage or wing and preferably adapted to effect heat exchange from the coolant to the air stream through the fuselage or wing skin. The discharge from the coolant circulation pump connects through pipe 423 with the inlet of the surface intercooler 54 in the centrifugal blower housing. The coolant outlet 424 of the said surface intercooler is connected to the inlet of the cooler 422 through pipe 425. Ethylene glycol, or like fluid, may be employed as the circulated coolant material.

The boundary layer removal fans as shown at 395 are provided with blades 427, the pitch of which are adapted to be varied over a wide range by means of suitable gearing contained in the fan hub 428, and which may be arranged as disclosed in United States Patent No. 2,294,350. Accordingly, said fan blade pitch varying mechanism in each hub is adapted to be actuated by means of push-pull rods which enter the front point of the hub 428 coaxially as best shown at 429 in Figure 7. Inward and outward motion of the rod 429 moves the fan blades to positions of smaller or greater angles of incidence relative to the air upon which said blades act when in rotation. A bell crank 430 pivotally supported within the airplane wing at 431 serves to reciprocably link said push-pull control rod 429 with rod 432, which is in turn pivotally connected at 433 with the outer end of a lever 434. The central pivot 435 of the said lever 434 is pivotally carried at the lower end of a rod 436 which extends out through a stuffing box in the wall of a closed chamber 438. The said rod 436 makes connection at its inner end with the free end of a closed Sylphon bellows 439. The opposite, or relatively fixed end of the said Sylphon bellows 439 is carried on the lower end of a threaded adjustable rod 440 which extends upward and out through a stuffing box in the upper wall of the chamber 438. The top of the rod 440 is rotatably connected through suitable gearing 442 to a manual adjusting means 443 which may be located in the flight compartment of the airplane.

The end of lever 434 opposite to pivot connection 433 makes rotatable connection by means of a suitable ball and socket joint 445 to the outer end of a needle valve stem 446 of a needle valve 447 adapted to be closed upon extended downward movement of said stem. Pipes 448 and 449 make connection with the inlet and outlet connections respectively of said valve.

A spring 450 normally acting under compression, extends between the upper end of the needle valve stem joint 445 and a fixed portion 451 of the bellows chamber 438.

The interior of the bellows chamber 438 is connected by tubing 452 to one or both of the axial blower outlet scrolls as shown at 453 whereby the Sylphon bellows 439 is subjected on the exterior thereof to air pressure corresponding to that of the said axial blower discharge.

The central pivotal portion 435 of the lever 434 is elastically coupled by means of a coil spring 455 to one end of a horizontal lever 456 which makes pivotal connection at the opposite end 457 with the outer end of a primary fuel valve piston rod 460. A coil spring 461 serves as an elastic linkage between an intermediate point 462 of the lever 456 and a control lever 463 which may be located in the flight compartment in such position as to be conveniently manually operated by the pilot or flight engineer in a manner similar to the conventional engine throttle. In case the pilot or flight engineer's control station is remote from the power plant control accessories, the throttle control lever 463 may be actuated from such remote station through suitable linkages or cable cotnrols, not shown.

The above mentioned throttle control lever 463 is pivotally supported at 465 upon a suitable member of the airplane structure.

At a point 466 on the control lever 463 intermediate the attachment point of the beforementioned spring 461 and the lever pivot 465, a second coil spring 467 normally acting under compression makes an elastic linkage to the outer end of a secondary fuel valve piston rod 468. An extended portion 469 of the control lever 463 is adapted upon rotative movement of the control lever 463 along the sector 470 in the direction of the arrow 471 to first actuate the ignition and fuel pump switch 472 and then the starter switch 473 in succession.

The beforementioned primary and secondary fuel valve piston rods 460 and 468 enter through stuffing boxes 475 and 476 into the fuel valve housing 477, and are reciprocably supported and guided therein by an intermediate divisional wall 479 through which they slidably pass in a liquid and gas-tight fit. The inner ends of the piston rods 460 and 468 terminate in needle points 482 and 481 which are adapted, in the closed positions, to seat upon corresponding beveled outlet valve seats 483 and 484 from which outflowing fuel pipes 485 and 486 extend.

The said piston rods 460 and 468 carry a pair of pistons 487 and 488 fixed thereto at an intermediate point which make fluid-tight sliding fit in a pair of cylinder bores 489 and 490 formed within the lower half of the valve housing 477 and interconnected at both ends by ducts 491 and 492. Air pressure and vacuum connections leading to the upper and lower interconnected heads of said cylinder bores by means of which a differential pressure can be established on the pistons 487 and 488 are shown at 493 and 494 respectively. The said pressure pipe connection 493 leads to the final stage air compressor discharge at the inlet 145 to the combustion chamber through an inlet nipple 495 through the combustion chamber housing, and the vacuum pipe connection 494 makes connection through the combustion chamber housing at 496 to the Venturi section of one of the burner tubes as shown at 497 in Figures 5 and 6.

Carried on the beforementioned piston rods 460 and 463 adjacent the needle points 482 and 481, are another pair of pistons 498 and 499 respectively, which make a loose sliding fit in cylinder bores 500 and 501 formed in the upper half of the valve housing 477 above the division wall 479. The lower head ends of the said cylinder bores 500 and 501 are interconnected by a duct as shown at 502 and are connected externally through a fuel supply pipe line 503 which leads from a pressure fuel feed pump P, which in turn takes suction directly from the bottom of a fuel storage tank T to avoid possibility of suction line vapor lock. The upper head ends of the cylinder bores 500 and 501 are provided with centrally located outlet ports 483 and 484, which constitute the beforementioned beveled needle valve seats upon which the needle points 481 and 482 of the upper ends of the piston rods rest when in the closed position. The said outlet ports 483 make connection through the fuel supply pipe line 485 to the primary fuel burner nozzle manifold 112, and the outlet port 484 makes connection through the fuel supply line 486 to the combustion chamber housing at 504 and thence through the bore 136 coaxially positioned within the gas turbine shaft 118, to the supplementary fuel burner orifices 137.

A rheostat 506 having a common support with the fuel valve housing is adapted to be operated to vary the resistance thereof by means of a movable contact arm 507 pivoted at 508 and adapted to be actuated through a link 509 interconnecting the lower end of valve rod 460 and crank 510. The electrical circuit thus adapted to be varied is completed by means of the beforementioned ignition and fuel pump snap switch 472 through battery 511, conductor 512 and said resistance 506, through conductor 513 to the fuel pump motor M1 and return by way of the ground connections shown. The electrical power input to the fuel pump drive is thus adapted to be varied as a function of the throttle setting and the fuel demand. At the same time a parallel circuit through the ignition glow plugs is completed by said switch 472 from battery 511 through conductor 132 and return through the ground connections.

The beforementioned oil line 448 connects through pipe 586 to the outlet of a centrifugal oil pump 587 which takes suction through pipe 588 from the oil scavenging outlet connection 585 in the bottom of the axial blower transmission housing. The oil pump 587 is adapted to be driven by an auxiliary drive shaft 589 which extends laterally from the counter-rotation transmission of Figure 10.

Also driven by auxiliary shaft 589, or another suitable one of the auxiliary shafts extending from the counter-rotation transmission, is a centrifugal air booster pump 590 which takes suction through line 591 from the discharge of the final stage air compressor at its inlet to the combustion chamber. The pump 590 discharges through pipe 592 to the injection air manifold 111 leading to the fuel spray nozzles in the burner tubes as best shown in Figure 5. This insures improved atomization of the fuel and removes radiant heat from burner nozzle parts by convection.

With further reference to Figure 7, 525 is a compressed air storage flask of spherical shape which is interconnected for charging, with the discharge of the final stage air compressor through nipple 495, pipe 527, check valves 528 and 529, and pipes 530 and 531 whereby air at final stage pressure of approximately 250 pounds per square inch may be stored during operation of the power unit. An air compressor A, electrically driven by a motor M2, serves to compress air from an atmospheric intake 532 to a pressure of approximately 300 pounds per square inch and deliver it through pipes 533 and 531 to the air flask 525 for stand-by service or initial starting purposes. The motor M2 is controlled by means of a pressure actuated switching device 535 associated with the air storage flask 525 which functions to close the motor circuit to operate the air compressor when the air pressure in said flask falls below a predetermined value.

A high speed compressed air operated turbine wheel 537 is mounted on the drive shaft 538 of an electric generator E. The extension 539 of the generator shaft is coupled through an overrunning clutch 540 to the accessory drive shaft 187 which extends radially from the counter-rotation differential transmission as described hereinbefore, primarily in connection with Figures 1 and 10.

The turbine wheel 537 receives compressed air through two nozzles 541 and 542. The nozzle 541 is connected to the air storage flask 525 through pipe 531, electric starter valve 543 which by-passes the check valve 529, pipe 544, branch pipe 545, and nozzle control valve 546. Opposite the nozzle 541 the air turbine exhausts to atmosphere through a suitable exhaust pipe shown at 547. The turbine nozzle 542 makes connection with pipe 544 through a branch pipe 548 and a two-way cock 549 which completes the connection either directly through pipe 550 to the nozzle 542, or through pipe 551, intercooler 552, and return pipe 553 to the said nozzle 542. The exhaust 555 from nozzle 542 may be connected through pipe 556 to the cabin enclosure of the airplane, a fragment of the skin of which is illustrated at 557 in Figure 7. The beforementioned two-way cock 549 is adapted to be operated to direct flow of air from pipe 544 either through pipe 550 or 551 or to divide flow between them in accordance with the temperature of outflowing air at 558. The said control of cock 549 is accomplished by means of a temperature sensitive device such as a thermostat at 559 acting through a suitable coupling 560 and actuating device 561. The intercooler 552 is preferably of the skin surface type, and may be located in any suitable place within the fuselage or wing structure where heat exchange with the air stream can be effected. The cabin air conditioning system forms the subject of my copending application, Serial No. 575,913, filed February 2, 1945, now Patent No. 2,582,848.

Figure 12:
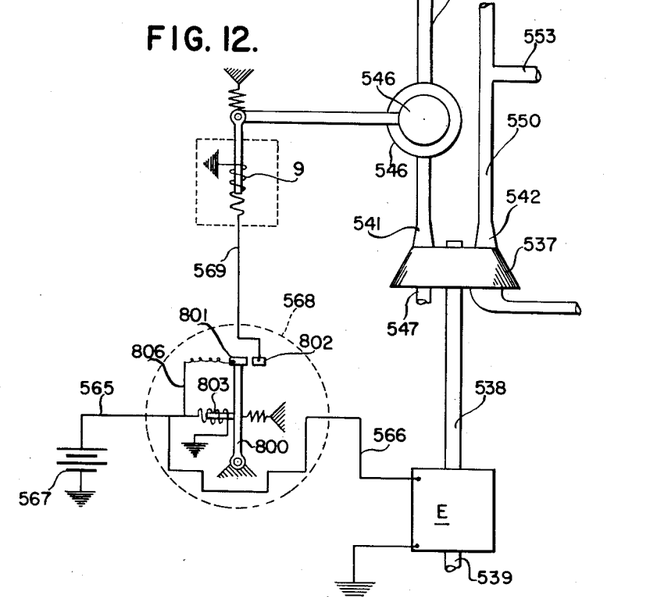
Figure 12 is a fragmentary diagrammatic view of a portion of the system illustrating the voltage regulator means and associated parts.

The generator E is adapted to supply a charging current through conductors 565 and 566 to a suitable bank of storage batteries 567. A differential voltage sensitive switch 568 serves through suitable coupling 569 and valve actuating means such as a solenoid 9, to actuate the nozzle control valve 546 in such a manner as to increase or decrease air supplied to the turbine in accordance with battery charging and electric accessory current needs. The differential voltage sensitive switch 568 is of a conventional voltage operated type, and is so constructed and arranged as to energize electromagnetically actuated means 9 to open the throttle valve 546 when the voltage of the battery 567 drops below a predetermined value, and to close the throttle valve 546 when the voltage of said battery rises above a predetermined value. As diagrammatically illustrated in Figure 12, the conventional differential voltage sensitive switch 568 resembles a volt meter and includes a pivoted spring urged lever or needle 800 carrying a contact 801 adapted to cooperate with a stationary contact 802 on the above mentioned conductor or coupling 569. A multi-turn solenoid 803 having high resistance is connected with the generator-battery leads 565 and 566 to operate the needle 800. A flexible lead 806 connects the contact 801, which is insulated from the needle 800, with the battery lead 565. So long as the voltage in the battery circuit is above a given value the solenoid 803 serves to hold the contact 801 out of engagement with the contact 802. However when the voltage drops below the given value the contact 801 engages the contact 802 to complete a circuit through leads 565, 806 and 569 to the solenoid 9 which in turn opens the valve 546 as above described.

The operation of the apparatus of this invention will now be described, following for convenience, the sequence of operations from starting of the power unit to cruising conditions.

The control lever 463 is first moved along the sector 470 from the "stop" position to the position indicated as "ignition." In so doing, the lever extension 469 actuates the ignition snap switch 472 to complete the low voltage electric circuit through the glow plugs by way of conductor 132 and return through the ground connection. The use of a low voltage ignition circuit of this type has the advantages of simplicity, freedom from creating radio interference and efficiency, especially at high altitudes where corona losses and insulating difficulties are prevalent with the conventional high tension systems commonly employed for internal combustion engines. At the same time, the fuel pump motor circuit is also closed by the same switch to complete the battery circuit from battery 511 through the rheostat 506 and the conductor 513. At this position the rheostat contact arm 507 is at a position on the resistance windings 506 of maximum resistance and corresponding minimum power input to the fuel pump. At this position the pump produces a comparatively small fuel pressure. When the filaments of the glow plugs have reached the ignition temperature of the gas fuel mixture to be subsequently introduced and the fuel pressure has come up to the starting pressure, the control lever 463 is then advanced to the "starter" position which actuates the starter switch 473 to complete the electrical circuit from the battery 570 through the conductor 514, the solenoid 543' of the starter air valve 543 and return through the ground connections. This completion of the starter circuit results in opening the valve 543 and admitting air from the pressure flask 525 through lines 544, 545, and regulating valve 546 to the nozzle 541 of the air starter turbine wheel 537. This turbine wheel, which is designed particularly for starting with a relatively small flow of air may be relatively small in size; for example, it may be six inches in diameter and capable of delivering about 30 BHP. The resultant torque from the turbine wheel 537 is transmitted through the overrunning clutch 540 and shaft 187 to the intermediate pinion 186 as shown in Figure 10, which meshes with gears 185 and 82, and drives the gas turbine shaft 118 and the blower shaft 76 in counterrotation with respect to one another. As soon as the turbine and the blowers are up to about 15 per cent of normal speed, sufficient air will be self-supplied by the blower and the compressor of the unit to the combustion chamber to establish an appreciable differential pressure in the pipes 493 and 494, which lead respectively to the point of discharge of the second stage compressor into the combustion chamber at 495 and to the Venturi section of one of the burner tubes as best shown at 497 in Figures 5 and 6. This said differential pressure is communicated to the fuel valve actuating pistons 487 and 488 in the interconnected cylinders 489 and 490, and is such as to tend to move the fuel control needle valves downwardly off their valve seats 483 and 484.

At the starter position of the control lever 463 on the sector 470, the spring 467 is under sufficient compression to hold the needle valve 484 firmly closed, but the compression in spring 461 is at this point so balanced that as soon as the flow of air through the burner tubes is established to a given value during the starter cycle, the above mentioned resultant differential pressure acting upon the piston 487 is sufficient to "crack" the needle valve 483 and allow a proper amount of fuel to flow through line 485 to the primary fuel jet manifold 112, and thence to the spray jets 106 in the burner tubes to initiate operation of the power unit. The unit is thus started and brought up to idling speed.

The unit thus becomes self-motoring at approximately fifteen per cent of rated speed, and a smaller amount of starting air is required than if air were released from the tank directly to the inlet of the gas turbine, the flow passages of which are obviously disproportionately large for starting purposes. At idling speed the overrunning clutch 540 disengages the shaft 187 from the starter turbine 537 and the generator E, preventing them from being driven at excessive speeds by the power unit.

Upon further advance of the control lever 463 from the starter position, and along the power steps 1 to 4 of the sector 470 in the direction indicated by arrow 471, the compressive force of the spring 461 is further relaxed, tending to allow the primary fuel needle valve to open further and to feed a greater quantity of fuel to the burner jets. However, regulatory forces are immediately automatically superimposed upon the fuel control valve motion to meter the fuel permitted to flow to the burner jets in accordance with the quantity of flow of air through the combustion zone in order to insure a proper and efficient fuel air mixture, and particularly to produce a nearly constant combustion temperature thereby limited to protect the gas turbine from thermal damage. These regulatory forces are applied to the needle valve stems; for example, the primary fuel needle valve stem 460 in a direction tending to reclose the needle valve by means of the friction of the increased flow of fuel upward around the piston 498 and the force upon piston 487 is, as beforementioned, applied through pipes 493 and 495, and tends to move the needle valve to an open position. The force applied to piston 498 is thus opposed to that applied to piston 487 and tends to return the valve to a closed position upon flow of fuel through the cylinder, said force being caused by the differential pressure imposed upon the piston 498 by frictional flow of fuel through the small clearance between the piston and cylinder walls and towards the valve outlet 483. The flow of fuel from the primary fuel valve is thus a modified combined function of the rates of flow of fuel and air to the combustion zone, which tends under all conditions to maintain a proper fuel-air ratio for any given power control setting.

Up to this point in the initial stages of operation of the power unit, the supplementary fuel needle metering valve 484 has remained inoperative and in a closed position under the compressive force of spring 467. As the control lever is still further advanced over the power settings on the sector and nears the position marked "supplementary fuel," the spring 467 reaches an elongation where its compressive force is reduced to a value permitting the supplementary fuel needle metering valve to lift off the valve seat 484 to allow supplementary fuel to flow through line 486, inlet fitting 504 in the combustion chamber housing, through pipe 570, fitting 572, tube 573 to the bore 136 of the gas turbine shaft 118 and thence to the supplementary fuel orifices 137 in the apex 135 of the gas turbine rotor. Supplementary fuel is thus sprayed into the secondary combustion chamber S from orifices 137 where it burns in the presence of the excess air carried in the gas turbine exhaust gases.

Still further advance of the control lever causes still further opening of the supplementary fuel valve 484 to supply an added quantity of fuel to the secondary combustion zone. The metering of the supplementary fuel is subject to the same automatic regulation as that before described in connection with the primary metering valve so that the total final quantity of fuel, both primary and supplementary, does not exceed that just required for the burning of all of the air leaving the gas turbine. Were it not for the flow controls described, raw fuel might be lost through the propulsive nozzle.

During the before described forward advance of the control lever 463, the rheostat has been actuated through the associated linkage hereinbefore described, to progressively decrease its resistance and thus to increase the power input to the fuel pump drive to produce a fuel pressure in line 503 which varies as an approximate function of the demand. The needle does not, in fact, appreciably throttle the fuel, but rather the fuel pump speed is directly controlled at the fuel source according to the fuel quantity requirement and the combustion air back pressure. The needle "trims" the flow to the exact quantity indicated with only small throttling action. This conserves electric power and prevents fuel vapor lock due to frictional overheating. Furthermore, this fuel pressure system makes possible the use of very small fuel lines since fuel pressure drop in lines is compensated for by the flow control. A further controlling factor is thus combined with the automatic characteristic of the fuel metering valve mechanism which tends to impart automatic regulatory characteristics to the unit as a whole. For example, in the event the control lever is moved forward suddenly, an immediate increase in fuel pressure with momentary corresponding increase in flow to the burner will result. This momentary increase in flow of fuel will take care of the acceleration and increased primary and supplementary fuel requirements of the unit under high power output conditions.

Assuming now that following the before described starting operations, a relatively low cruising speed of approximately 600 feet per second relative to the air at zero pressure altitude has been attained by the power unit and the associated aircraft, the operation of the internal components of the power unit are as follows:

Air entering the ram R at high velocity and at a pressure of 14.7 pounds per square inch absolute, is compressed by impact to a pressure of approximately 18 pounds per square inch absolute, at the inlet 11 to the axial blower $C_1$. The air is discharged from the axial blower at a pressure of approximately 26 pounds per square inch absolute into the double scroll outlet housing 38—39, and thence through the outlet spigots 40 and 41 and ducts 42 and 43 to the wing skin intercoolers as best illustrated at 44—45 in Figures 1 and 7.

Cooled first stage compressed air from the said wing skin intercoolers returns through ducts 315 and 315' to the spigots 55 and 56, and thence to the entrance 58 of the first impeller of the multi-stage centrifugal compressor $C_2$. Compressed air from the first centrifugal rotor 59 passes through a liquid cooled surface intercooler 64 where it is again cooled, and thence through centrifugal impellers 67 and 71, and finally through the diffuser vanes 75 into the entrance 145 of the combustion chamber Z at a final pressure of approximately 240 pounds per square inch.

Here the compressed air is divided, a major portion flowing on through the internal passages of the burner tubes and through the substantially annular clearance spaces between the burner tubes and the combustion chamber housing 85 and inner shroud 86, and another portion of the air entering at 145 flows for cooling purposes, down through the tapering, substantially annular passageway 144 formed between the conical shaped turbine bearing support member 124 and the said inner shroud 86 of the combustion chamber and its baffle extension 143, to the inner apex of the gas turbine rotor adjacent the rotor bearing 119. From here a portion of the cooling air turns, as indicated by arrow 146 best shown in Figure 11, and flows back along the inner surface of the turbine rotor shell 115 and in heat exchange contact with the inner ends of the rotor blade roots as shown at 127, and finally is exhausted to the gas turbine expansion zone inlet through the annular cooling air nozzle ring 147 which is positioned immediately inside of and concentric with the annular combustion gas nozzle ring 90 where it joins in laminar flow, the combustion gases issuing from the combustion chamber Z. The air thus flows from the annular inlet at the surface of the turbine rotor and forms a concurrently flowing layer of relatively cool air intermediate the hot propellant combustion gases and the outer surface of said rotor. This relatively cool boundary layer of air thus flowing along the outside surface of the turbine wheel serves to cool and to shield it and the blade roots from the high temperature gases.

Another portion of the air conducted to the inner apex of the gas turbine rotor adjacent the bearing 119 passes through the ducts 142 into the cooling cavity 139 and thence out through the discharge orifices 150 to the secondary combustion zone. Heat is thus carried away from the bearing 119 and from the massive apex portion of the turbine rotor.

That portion of the compressed air which passes through the clearance spaces between the burner tubes and the combustion chamber walls serves to cool both the chamber housing and the burner tube and to dilute the products of combustion, leaving the burner tubes sufficiently to limit the combustion chamber gases to a safe value. Another portion of the air passes through the central tubular passages 98 of the burner tubes and serves to cool the inner elements thereof including the fuel spray tip and nozzle 105 and 106. That portion of the compressed air which passes through the Venturi shaped passages 97 of the burner tubes meets and mixes with the atomized spray of fuel issuing radially through the holes 100 in the inner tubular portion of the burner from perforations in the spray nozzle head 106. The resultant air-fuel mixture once ignited by the hot filament 123 of the glow plug 99, continues to burn throughout the length of the burner tube passages. The said burner tubes, as hereinbefore stated, are preferably constructed of Carborundum, which when heated, has catalytic properties which contribute beneficially to the rapidity and efficiency of the combustion process.

The heated gaseous combustion products and excess air of greatly expanded volume are continuously released from the combustion chamber at high velocity through the restricted opening formed through the annular nozzle ring 90 into the initial stages of the gas turbine expansion zone. The metal of the nozzle ring 90 is cooled to some extent by the expansion of cooling air in the adjoining cooling air nozzle ring 147, preventing thermal erosion.

The expanded and partially cooled gases from which a portion of the power has been extracted in passing through the gas turbine in the form of rotative torque applied to the turbine shaft 118, is discharged axially from the gas turbine expansion stages into the secondary combustion chamber S and thence out through the nozzle N in the form of a rearwardly directed and efficiently expanded high velocity reactive gaseous jet. The propulsive force exerted by the reaction of the gases leaving the said nozzle N is the thrust which is utilized in whole or in part to propel the unit and the aircraft with which it is associated.

When additional thrust is required, and at certain times when maximum efficiency of operation of the unit is to be attained, more or less supplementary fuel injection into the secondary combustion zone S through the orifices 137 in a manner as hereinbefore described, is employed. Such supplementary fuel enters the secondary combustion chamber in the form of a fine spray of a mixture of vaporized and atomized fuel where it meets and mixes in most part with the high velocity gases issuing from the gas turbine, with the heavier particles of the unvaporized fuel spray reaching and impinging upon the inner surface of the annular shaped refractory baffle 160. Secondary combustion is thus promoted with the excess air associated with the said gas turbine exhaust gases. The said annular baffle 160 prevents the secondary combustion flame from directly contacting the inner lining of the combustion chamber and aids in the surface combustion of the liquid fuel particles which reach it.

The transmission of power from the gas turbine to the compressor and auxiliary equipment is as follows:

The high speed rotation of the rotor of the gas turbine G is transmitted through the turbine shaft 118 and through the before described counter-rotation transmission to the shaft 76 of the second stage centrifugal compressor $C_2$. The accessory drive shafts 187, through which the unit is brought up to starting speed, as before described, extends radially from the said housing transmission and is driven by the bevel pinion as shown at 186. Another accessory drive shaft 589, similarly driven, extends radially from another convenient portion of the said transmission housing, and serves to drive the before mentioned spray nozzle booster air pump 590 and oil pump 587.

The chief function of the rotation reversing transmission is substantially to balance or cancel out the gyroscopic effect of the various high speed rotating bodies within the unit, and its incidental value resides in the convenient facilities it provides for auxiliary drives of the type just mentioned. The balancing out of the gyroscopic forces is of great importance in a maneuvering type of airplane, particularly in a combat airplane to avoid precessional effects while making quick turns or "pull outs" from a dive.

The balance of the power from the turbine, not absorbed in driving the auxiliaries and second stage compressor is transmitted on through the shaft 76 to the axial blower transmission hereinbefore described primarily in connection with Figure 8. The operation of the said axial blower transmission is as follows:

The rotation of the shaft 76 is imparted through flange 193 to the planetary drive spider 194, and the plurality of planetary pinions 195 carried therein and also to the fluid coupling impeller 199 carried within the housing 30—31 upon the concentric shaft extension 196. As before described, the said planetary pinions 195 mesh on the inside with the sun gear 201 fixed to the axial blower shaft 32 and on the outside with the ring gear 203 fixed on the inside diameter of the accessory drive bevel gear 204. The axial blower shaft extension 32 and the bevel gear 204 are thus differentially driven by the beforementioned planetary pinions. The bevel gear 204 meshes with the plurality of bevel pinions as shown at 207, which drive a number of accessory shafts which extend radially from the differential transmission as shown at 208 and 388. The power transmitted through shaft 76 is thus divided by the planetary pinions 195, between the various accessory drive shafts and the axial blower shaft 32, or in other words, the power transmitted through to the axial blower is the difference between the input of shaft 76 to the transmission and that absorbed by the accessory drives. The relative speed of rotation of said auxiliary shafts and blower shaft are likewise differential.

Assuming that the fluid coupling is substantially empty of oil, the relative or differential speeds of the accessory drive shafts and the axial blower shaft will be entirely a function of the corresponding torque of the combined accessory drives relative to the torque of the axial blower. For example, if the torque on the accessory drive is light, resulting in its high speed, then the speed of the axial blower will be lower; but if on the other hand, the load on the accessory drive is increased, resulting in lower accessory drive shaft speed, then the axial blower speed will be differentially higher. The methods by which the loading on the accessory differential drive is varied will be described hereinafter in connection with the boundary layer control apparatus.

Now if the fluid coupling housing is progressively filled with fluid by the introduction of oil under pressure from pump 587 by way of pipe 586, valve 447, pipe 449, fitting 576 and central bore 198 in shaft 32, and finally through the lateral inlet hole 197 in the coupling housing 30, the degree of coupling between the two shafts 32 and 196 may be progressively increased. In so doing the speed of the axial blower becomes progressively more directly dependent upon the transmission input speed of shaft 76—196 carrying the coupling impeller 199 and less dependent upon the differential effect of the loading of the accessory shafts, and the speeds of the accessory drives will at the same time be thereby increased with respect to said axial blower speed. In this manner a wide range of power distribution and relative speeds between the accessory drives and axial blower may be attained without the power losses customarily associated with variable speed drives which usually dissipate power wastefully.

In order to maintain the fluid couplings filled with oil, a constant supply must be maintained by the pump 587 to compensate for that constantly bled out of the fluid coupling housing through the annular clearance space 277 between housing 31 and shaft 196, and if the supply of oil is reduced below a certain maximum flow or completely cut off as by closing the needle valve 447, the coupling will slowly empty itself of fluid in this manner either until equilibrium between the rate of supply and loss of fluid is reached, or until the fluid coupling is completely empty. The oil thus released from the fluid coupling is scavenged from the transmission housing through a suitable scavenging outlet connection as shown at 585 and returned through line 588 to the suction of the pump 587 as shown in Figure 7.

The differential power transmitted to the accessory shafts in the manner before described, may be dissipated by rotation of the landing wheels and/or by the counter-rotating propellers for take-off, by driving on the boundary layer removal fans, and coolant fluid circulating pumps and/or other accessory equipment. During cruising flight conditions the accessory power absorption from the differential transmission is largely controlled by varying the load on the pluraltiy of boundary layer removal fans, and this is accomplished by variation of the pitch of the fan blades as hereinbefore described in connection with Figure 7.

As previously stated, the axial blower speed is partially controlled or trimmed by governing the oil supply to the fluid coupling. This governing is accomplished by a needle valve 447, controlled by the Sylphon bellows 439 which is subjected on the exterior to the axial blower discharge pressure transmitted thereto through tube 452. If the axial blower pressure falls below a predetermined value, the resultant reduction in pressure in the bellows housing 438 and the attendant expansion of the bellows 439 tends to close the needle valve and reduce the oil supply, thereby allowing the quantity of oil in the coupling to be reduced. This in turn reduces the degree of coupling between shafts 76 and 32, thus allowing the differential drive to function more freely to increase the axial blower speed relative to the input shaft 76 and thereby to apply a corrective effect upon the said axial blower discharge pressure. An increase of axial blower pressure above the same predetermined value similarly results in increased coupling between shafts 76 and 32, tending to reduce the axial blower speed relative to the shaft 76 and to apply again a corrective effect in the opposite sense upon the axial blower discharge pressure. Substantially constant axial compressor discharge pressure is thus maintained with variation in pressure altitude.

The expansion or contraction of the length of the said Sylphon bellows 439 corresponding to the respective decrease or increase of axial blower discharge pressure also acts at the same time through lever 434, link 432, crank 430 and through the mechanism before described in connection therewith in Figure 7, to increase or decrease the pitch of the blades of the plurality of boundary layer removal fans. The torque thus applied to the transmission accessory drive tends to vary inversely as a function of the axial blower discharge pressure, the effect of which is to apply a corrective effect through the differential transmission upon the axial blower speed.

For example, if the pressure altitude is increased with an attendant reduction in ram inlet pressure, the resultant initial reduction of the axial blower discharge pressure transmitted to and acting upon the Sylphon bellows 439 will tend to actuate the lever 434 and linkage leading from the lever pivot 433 to the push-pull rod 429 in such a manner as to increase the pitch of the boundary layer removal fan blades. The resultant increase in torque imposed on the said fans, and the corresponding reduction in speed of the fan drive shafts will result, through the differential action of the transmission, in a corrective increase in axial blower speed which tends to return the axial blower discharge pressure to a constant value.

The initial setting and adjustment of the action of the said Sylphon bellows 439 for predetermination of the axial blower discharge pressure to be maintained may be made by the threaded adjustment on screw 440 which may be actuated remotely through a shaft and gearing 442 by means of a manually operated wheel 443 which may be located in the flight compartment for convenience.

When the power unit is in normal operation the overriding clutch 540 acts to disengage the generator drive shaft 538 from the accessory drive shaft 187 through which the unit is started as before described. Following this, the generator E is driven solely from the air turbine 537 by air fed through either one or both of the nozzles 541 or 542. Ordinarily the air throttle 546 is actuated by means of a voltage sensitive device 568 in such manner as to supply just sufficient air to primary nozzle 541 to meet the power requirement for current demanded for changing the batteries and for the various electrical facilities within the aircraft.

Air for conditioning and pressurizing the cabin 557 is supplied through pipe 556 from the exhaust 555 of the air turbine secondary nozzle 542 which in turn receives compressed air from the discharge of the second stage compressor of the power unit through pipe 527, 544 and the two-cock 549. The compressed air may be fed to the secondary nozzle 542, either direct through pipe 550 or through an intercooler 552, or both, in proportions determined by the adjustment of cock 549 which is actuated by means of suitable electrically operated means 561 connected through the conductor 560 with a thermostat control 559 exposed to the cabin air being exhausted at 558.

When the air is delivered direct to the secondary jet 542 without intercooling, it leaves the turbine warm even after expansion therein. If, however, the air is passed through the intercooler 552 prior to delivery to the nozzle 542, the subsequent expansion in the turbine will be sufficient to appreciably cool the air. By adjustment of the relative quantities of cooled and uncooled air delivered to the said turbine nozzle 542, the temperature of the air delivered to the cabin under pressure through the duct 556 can be controlled as desired.

From the foregoing it will be evident that the invention may have a number of equivalent embodiments and several forms and arrangements of associated apparatus. It is to be understood that the foregoing is not to be limiting, but may include any and all forms of method and apparatus which are included within the scope of the claims.

I claim:

1. In a gas turbine power plant, a compressor, a gas turbine axially aligned with the compressor, a gear drive connecting the gas turbine and compressor, a combustion chamber receiving compressed air from the compressor and supplying actuating heated gases and air to said gas turbine, a starting system for the plant comprising an air turbine starting motor, a driving connection extending radially from said gear drive to said starting motor whereby said starting motor is operable to drive said gas turbine to initiate power plant action, said driving connection including a gear forming part of said gear drive and having its axis disposed radially of the common axis of the gas turbine and compressor, a source of air under pressure for operating the air turbine motor, an ignition device including an ignition circuit for the combustion chamber, and a mechanism for controlling the sequence of operation of said ignition device and said motor to close said ignition circuit before said motor is operated to effect starting of the power plant.

2. In a gas turbine power plant having a compressor, a gas turbine aligned axially with said compressor and a combustion chamber for receiving compressed air from the compressor and for supplying propellant hot air and gases to the turbine to drive the same, the combination of a gear transmission between the gas turbine and compressor whereby the gas turbine drives the compressor, the transmission including a pair of axially aligned bevel gears rotating respectively with the gas turbine and compressor, at least one shaft extending radially relative to the aligned bevel gears, and a bevel pinion fixed to the shaft and meshing with both said bevel gears, a starting turbine for driving said shaft to thus drive the gas turbine and compressor to initiate power plant operation, means for supplying actuating gas under pressure to the starting turbine to drive the same, and an automatic mechanism for terminating the starting effort of the starting turbine when the power plant attains a given speed in relation to the speed of the starting turbine.

3. In a gas turbine power plant having a compressor, a gas turbine aligned axially with said compressor, and a combustion chamber receiving compressed air from the compressor and supplying hot compressed air and gases to the gas turbine to drive the same, the combination of a gear transmission interposed between the gas turbine and the compressor whereby the gas turbine drives the compressor, the transmission including a shaft extending radially relative to the direction of rotation of the turbine and in driving relation thereto, an air turbine of relatively small capacity in driving relation to the shaft for starting the power plant, a tank for containing compressed air for actuating the air turbine, and a bleed connection for bleeding compressed air from the compressor, when in operation, to the tank.

4. In a gas turbine power plant having a compressor, a gas turbine aligned axially with said compressor, and a combustion chamber for receiving compressed air from the compressor and for supplying propellant hot air and gases to the turbine to drive the same, the combination of a gear transmission between the gas turbine and the compressor whereby the gas turbine drives the compressor, said transmission comprising a pair of axially aligned gears coaxial with the gas turbine and the compressor and connected to the gas turbine and compressor, respectively, to rotate with the gas turbine and compressor, respectively, and having teeth on their opposed faces, a shaft extending radially relative to said gears, a pinion carried by said shaft and meshing with both gears, and a starting turbine connected to said shaft to drive said shaft and thus to drive the gas turbine and compressor to initiate power plant operation.

5. In a gas turbine power plant having a compressor, a gas turbine aligned axially with said compressor, a combustion chamber receiving compressed air from the compressor and supplying actuating heated gases and air to said gas turbine, the combination of a gear transmission between the gas turbine and the compressor whereby the gas turbine drives the compressor, said transmission including a pair of gears connected to said gas turbine and said compressor, respectively, a shaft extending radially of the common axis of the gas turbine and compressor, a gear secured to said shaft and having driving and driven engagement with the gear which is connected to said gas turbine, and a starting system for the plant comprising an air turbine of relatively small capacity connected to said shaft to drive the same, a storage tank for containing and supplying compressed air for actuation of the said air turbine to start the power plant, and means for conducting compressed air from said compressor to said storage tank during power plant operation.

6. In a power plant having a compressor, a gas turbine, means for driving the compressor from said turbine, and a combustion receiving compressed air from the compressor and supplying actuating heated gases and air to said gas turbine, a starting system for the plant comprising an air motor in driving relation to the gas turbine, a compressed air container for supplying compressed air for the actuation of said motor to start the plant, and means for supplying compressed air under pressure to said container when the pressure therein falls below a given value comprising a conduit for conducting compressed air from said compressor to said container during power plant operation, an auxiliary compressor for supplying compressed air to said container, and means responsive to the pressure in said container for controlling the operation of said auxiliary compressor.

7. A gas turbine power plant comprising a compressor, a gas turbine aligned axially with said compressor, a drive connecting the gas turbine and the compressor, a combustion chamber receiving compressed air from the compressor and supplying actuating heated gases and air to said gas turbine, starting means operable to produce initial rotation of the compressor and the turbine including an air turbine starting motor, and conduit means for conveying compressed air from said compressor to said motor for expansion therein, and means in driving engagement with said drive and including a shaft extending radially of the common axis of said gas turbine and compressor for transmitting power from said motor to said gas turbine and compressor to rotate the same, said motor being connected to said shaft.

NATHAN C. PRICE.

REFERENCES CITED

The following references are of record in the file of this patent:

UNITED STATES PATENTS

| Number | Name | Date |
|---|---|---|
| 853,124 | Schaun | May 7, 1907 |
| 988,648 | Murphy | Apr. 4, 1911 |
| 999,976 | de Ferranti | Aug. 8, 1911 |
| 1,007,094 | Gill | Oct. 31, 1911 |
| 1,028,364 | Knight et al. | June 4, 1912 |
| 1,049,084 | Hartsock et al. | Dec. 31, 1912 |
| 1,124,736 | Heany | Jan. 12, 1915 |
| 1,156,430 | Pearson | Oct. 12, 1915 |
| 1,440,815 | Bonta | Jan. 2, 1923 |
| 1,469,903 | Good | Oct. 9, 1923 |
| 1,579,398 | Rudqvist | Apr. 6, 1926 |
| 1,650,523 | Kettering et al. | Nov. 22, 1927 |
| 1,904,117 | Becker | Apr. 18, 1933 |
| 2,227,666 | Noack | Jan. 7, 1941 |
| 2,318,905 | Traupel | May 11, 1943 |
| 2,390,959 | Pfenninger | Dec. 11, 1945 |
| 2,399,046 | Larrecq | Apr. 23, 1946 |
| 2,452,298 | Goode | Oct. 26, 1948 |
| 2,476,218 | Prime et al. | July 12, 1949 |
| 2,531,761 | Zucrow | Nov. 28, 1950 |

FOREIGN PATENTS

| Number | Country | Date |
|---|---|---|
| 6,017 | Great Britain | Mar. 12, 1909 |
| 577,950 | France | June 18, 1924 |